United States Patent
Kimura et al.

(10) Patent No.: US 11,014,452 B2
(45) Date of Patent: May 25, 2021

(54) ELECTRICALLY DRIVEN VEHICLE

(71) Applicant: Toyota Jidosha Kabushiki Kaisha, Toyota (JP)

(72) Inventors: Masaru Kimura, Toyota (JP); Yusuke Furuhashi, Toyota (JP); Hidenori Yamada, Toyota (JP); Yusuke Hattori, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 100 days.

(21) Appl. No.: 16/260,677

(22) Filed: Jan. 29, 2019

(65) Prior Publication Data

US 2019/0232788 A1 Aug. 1, 2019

(30) Foreign Application Priority Data

Jan. 31, 2018 (JP) .............................. JP2018-014857

(51) Int. Cl.
*B60L 1/02* (2006.01)
*B60L 50/51* (2019.01)
(Continued)

(52) U.S. Cl.
CPC ............... *B60L 1/02* (2013.01); *B60L 3/0046* (2013.01); *B60L 50/51* (2019.02); *B60L 53/16* (2019.02);
(Continued)

(58) Field of Classification Search
CPC .......... B60L 1/02; B60L 50/51; B60L 3/0046; B60L 53/16; B60L 53/20; B60L 2240/80;
(Continued)

(56) References Cited

U.S. PATENT DOCUMENTS

| | | | |
|---|---|---|---|
| 2011/0187184 A1* | 8/2011 | Ichikawa | B60L 1/00 307/10.1 |
| 2012/0123625 A1* | 5/2012 | Ueo | H02J 7/342 701/22 |

(Continued)

FOREIGN PATENT DOCUMENTS

| | | |
|---|---|---|
| JP | 2017153255 A | 8/2017 |
| JP | 2017175723 A | 9/2017 |

*Primary Examiner* — Brian P Sweeney
(74) *Attorney, Agent, or Firm* — Dinsmore & Shohl LLP

(57) ABSTRACT

An electrically driven vehicle comprises a motor; a power storage device; a first power supply device connected with a power line; a charging device configured to charge the power storage device by using electric power from an external power source; and a second power supply device configured to supply part of the electric power from the external power source to auxiliary machinery via the charging device. The electrically driven vehicle performs a charging efficiency determination process that calculates a charging efficiency as a ratio of a charging power of the power storage device to an input power of the charging device, and that determines whether the charging efficiency is lower than a predetermined efficiency. When the charging efficiency determination process determines that the charging efficiency is lower than the predetermined efficiency, the electrically driven vehicle stops the second power supply device and performs the charging efficiency determination process again.

7 Claims, 6 Drawing Sheets

(51) Int. Cl.
   *B60L 3/00* (2019.01)
   *B60L 53/20* (2019.01)
   *B60L 53/16* (2019.01)

(52) U.S. Cl.
   CPC ............ *B60L 53/20* (2019.02); *B60L 2210/10* (2013.01); *B60L 2240/80* (2013.01)

(58) Field of Classification Search
   CPC .. B60L 2210/10; Y02T 90/12; Y02T 10/7072; Y02T 90/14; Y02T 10/70; Y02T 10/72
   See application file for complete search history.

(56) References Cited

U.S. PATENT DOCUMENTS

2014/0203634 A1* 7/2014 Sugiyama ............... B60L 53/22
                                                          307/10.1
2017/0274782 A1   9/2017 Nomura \* cited by examiner

ELECTRICALLY DRIVEN VEHICLE

CROSS-REFERENCE TO RELATED APPLICATION

This application claims priority to Japanese Patent Application No. 2018-014857 filed on Jan. 31, 2018, the contents of which are incorporated herein by reference.

TECHNICAL FIELD

The present disclosure relates to an electrically driven vehicle and more specifically relates to an electrically driven vehicle equipped with a charging device configured to charge a power storage device that is provided to supply electric power to a motor for driving, by using electric power from an external power source.

BACKGROUND

A proposed electrically driven vehicle includes a battery configured to supply electric power to a motor for driving; a main DC/DC converter connected with a power line from the battery to the motor and configured to supply electric power to auxiliary machinery; a charging device configured to charge the battery by using electric power from an external power source; and a sub DC/DC converter connected with the charging device and configured to supply electric power to the auxiliary machinery (as described in, for example, JP 2017-175723A). In response to a start request during external charging, this vehicle drives only the sub DC/DC converter when power consumption of the auxiliary machinery is lower than a predetermined value, while driving only the main DC/DC converter when the power consumption of the auxiliary machinery is equal to or higher than the predetermined value.

CITATION LIST

Patent Literature

PTL 1: JP2017-175723A

SUMMARY

In some cases, there is a need to calculate a charging efficiency and to detect whether the charging efficiency decreases, in the process of charging the battery using the electric power from the external power source. A procedure of obtaining the charging efficiency may calculate an input power that is input from the external power source into the charging device and a charging power for charging the battery and then calculate a ratio of the charging power to the input power as the charging efficiency. In the electrically driven vehicle described above, when the sub DC/DC converter is operated, the sub DC/DC converter supplies part of the input power to the auxiliary machinery. This results in a failure in appropriately calculating the charging efficiency and thereby appropriately determining a reduction abnormality of the charging efficiency.

A main object of an electrically driven vehicle of the present disclosure is to ensure more appropriate determination of a reduction abnormality of the charging efficiency.

In order to achieve the above primary object, the electrically driven vehicle of the disclosure is implemented by an aspect described below.

The present disclosure is directed to an electrically driven vehicle. The electrically driven vehicle includes a motor configured to input and output power for driving, a power storage device configured to transmit electric power to and from the motor, a first power supply device connected with a driving system power line, which the power storage device and the motor are connected with, and configured to convert electric power from the driving system power line and supply the converted electric power to auxiliary machinery mounted on a vehicle, a charging device configured to charge the power storage device by using electric power from an external power source, a second power supply device configured to supply part of the electric power from the external power source to the auxiliary machinery via the charging device, and a control device configured to perform a charging efficiency determination process that calculates a charging efficiency, which is a ratio of a charging power for charging the power storage device to an input power input into the charging device, and that determines whether the charging efficiency is lower than a predetermined efficiency. When the charging efficiency determination process determines that the charging efficiency is lower than the predetermined efficiency, the control device performs the charging efficiency determination process after stopping the second power supply device.

The electrically driven vehicle of this aspect comprises the motor configured to input and output power for driving; the power storage device configured to transmit electric power to and from the motor; the first power supply device connected with the driving system power line, which the power storage device and the motor are connected with, and configured to supply electric power to the auxiliary machinery; the charging device configured to charge the power storage device by using electric power from the external power source; and the second power supply device configured to supply part of the electric power from the external power source to the auxiliary machinery via the charging device. The electrically driven vehicle of this aspect performs the charging efficiency determination process that calculates the charging efficiency as the ratio of the charging power for charging the power storage device to the input power input into the charging device, and that determines whether the calculated charging efficiency is lower than the predetermined efficiency. When the charging efficiency determination process determines that the charging efficiency is lower than the predetermined efficiency, the electrically driven vehicle of this aspect performs the charging efficiency determination process again after stopping the second power supply device. This configuration ensures more appropriate determination of a reduction abnormality of the charging efficiency.

DETAILED DESCRIPTION

Figure 1:
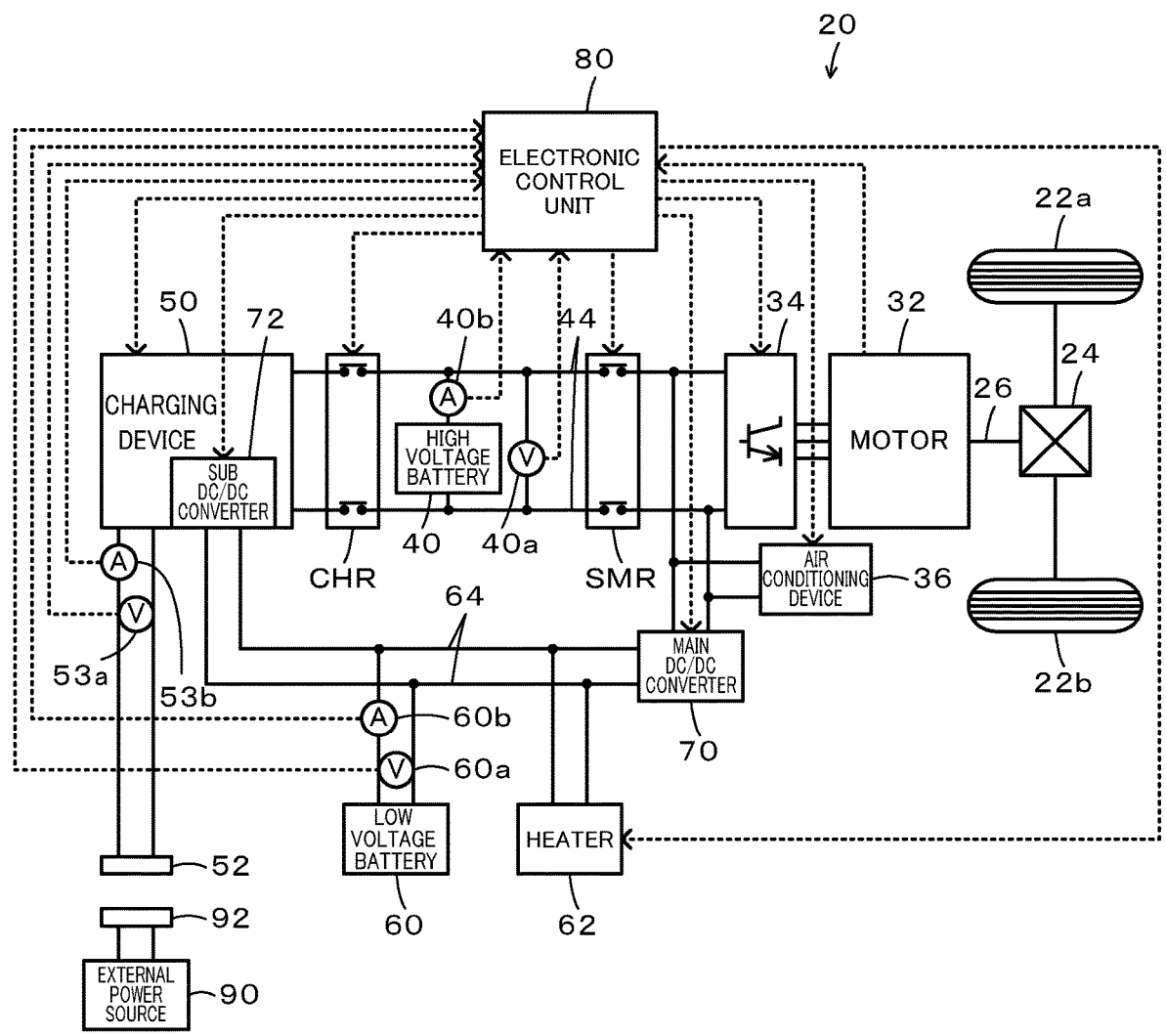
FIG. 1 is a configuration diagram illustrating the schematic configuration of an electric vehicle according to one embodiment of the present disclosure.

The following describes some aspects of the present disclosure with reference to an embodiment. FIG. 1 is a configuration diagram illustrating the schematic configuration of an electric vehicle 20 according to one embodiment of the present disclosure. As illustrated, the electric vehicle 20 of the embodiment includes a motor 32, an inverter 34, an air conditioner 36, a high voltage battery 40, a charging device 50, a low voltage battery 60, a main DC/DC converter 70, a sub DC/DC converter 72, a system main relay SMR, a charging relay CHR and an electronic control unit 80.

The motor 32 is configured, for example, as a synchronous generator motor and is connected with a driveshaft 26 that is coupled with drive wheels 22a and 22b via a differential gear 24. The inverter 34 is used to drive the motor 32 and is connected with high voltage-system power lines 44. A capacitor for smoothing is mounted to the high voltage-system power lines 44. The electronic control unit 80 performs switching control of a plurality of switching elements (not shown) included in the inverter 34, so as to rotate and drive the motor 32. The air conditioner 36 is connected with the high voltage-system power lines 44 and is controlled by the electronic control unit 80 to perform air conditioning in a passenger compartment.

The high voltage battery 40 is configured by, for example, a lithium ion rechargeable battery or a nickel metal hydride battery having a rated voltage of 200 V, 250 V, 300 V or the like and is connected with the inverter 34 via the high voltage-system power lines 44 as described above.

The charging device 50 is connected with the high voltage-system power lines 44 and is configured to charge the high voltage battery 40 using electric power from an external power source 90 when a vehicle-side connector 52 is connected with a power source-side connector 92 of the external power source 90. For example, the charging device 50 includes a power converter configured to convert AC power of the external power source 90 into DC power and a voltage converter configured to convert the voltage of DC power into a desired DC voltage. This charging device 50 is controlled by the electronic control unit 80 to supply electric power from the external power source 90 toward the high voltage battery 40-side when the vehicle-side connector 52 is connected with the power source-side connector 92.

The low voltage battery 60 is configured by, for example, a lead acid battery having a rated voltage of 12V or the like and is connected with low voltage-system power lines 64. A plurality of auxiliary machines including a heater 62 for temperature rising of the high voltage battery 40, headlights, a room lamp, an audio system, powered windows and a sheet heater, as well as electronic control units including the electronic control unit 80 are also connected with the low voltage-system power lines 64.

The main DC/DC converter 70 is connected with the high voltage-system power lines 44 and with the low voltage-system power lines 64. This main DC/DC converter 70 is controlled by the electronic control unit 80 to step down a voltage of electric power of the high voltage-system power lines 44 and supply the electric power of the stepped-down voltage to the low voltage-system power lines 64.

The sub DC/DC converter 72 is configured as a DC/DC converter having a smaller rated output than that of the main DC/DC converter 70. This sub DC/DC converter 72 is connected with a DC power system of the charging device 50 (for example, between the power converter and the voltage converter of the charging device 50 or between the voltage converter and the charging relay CHR). This sub DC/DC converter 72 is controlled by the electronic control unit 80 to convert the voltage of part of electric power from the external power source 90 via the charging device 50 and supply the electric power of the converted voltage to the low voltage-system power lines 64.

The system main relay SMR is provided between the high voltage battery 40 and the inverter 34 with the main DC/DC converter 70 on the high voltage-system power lines 44. The system main relay SMR is controlled by the electronic control unit 80 to be turned on and off and thereby connect and disconnect the high voltage battery 40-side with and from the inverter 34 and the main DC/DC converter 70-side.

The charging relay CHR is provided between the high voltage battery 40 and the charging device 50 with the sub DC/DC converter 72 on the high voltage-system power lines 44. The charging relay CHR is controlled by the electronic control unit 80 to be turned on and off and thereby connect and disconnect the high voltage battery 40-side with and from the charging device 50 and the sub DC/DC converter 72-side.

The electronic control unit 80 is configured as a CPU-based microprocessor and includes a ROM configured to store processing programs, a RAM configured to temporarily store data, and input/output ports, in addition to the CPU, although not being illustrated. Signals from various sensors are input into the electronic control unit 80 via the input port.

The signals input into the electronic control unit 80 include, for example, a rotational position of a rotor of the motor 32 from a rotational position sensor configured to detect the rotational position of the rotor of the motor 32, a battery voltage VB from a voltage sensor 40a placed between terminals of the high voltage battery 40, and a battery current IB from a current sensor 40b mounted to an output terminal of the high voltage battery 40. The input signals also include an input voltage Vin from a voltage sensor 53a mounted on an immediate downstream side of the connector 52 of the charging device 50 and an input current Iin from a current sensor 53b. The input signals further include an auxiliary machinery voltage Vh from a voltage sensor 60a placed between terminals of the low voltage battery 60 and an auxiliary machinery current Ih from a current sensor 60b mounted to an output terminal of the low voltage battery 60. The input signals additionally include an ignition signal from an ignition switch, a shift position SP from a shift position sensor, an accelerator position from an accelerator pedal position sensor, a brake pedal position from a brake pedal position sensor and a vehicle speed of a vehicle speed sensor, which are not shown.

Various control signals are output from the electronic control unit 80 via the output port. The signals output from the electronic control unit 80 include, for example, switching control signals to the plurality of switching elements included in the inverter 34, a control signal to the charging device 50, control signals to the auxiliary machines, for example, the heater 62 for temperature rising of the high voltage battery 40, a control signal to the main DC/DC converter 70, a control signal to the sub DC/DC converter 72, a control signal to the system main relay SMR and a control signal to the charging relay CHR.

The electronic control unit 80 calculates a state of charge SOC1 of the high voltage battery 40, based on an integrated value of electric current Ib1 of the high voltage battery 40 from the current sensor 40b, and also calculates a state of charge SOC2 of the low voltage battery 60, based on an integrated value of electric current Ib2 of the low voltage battery 60 from the current sensor 60b.

In the electric vehicle 20 of the embodiment having the above configuration, in response to connection of the vehicle-side connector 52 with the power source-side connector 92 of the external power source 90 during parking at a charging point, such as at home or at a charging station, the electronic control unit 80 turns on the charging relay CHR and controls the charging device 50 to charge the high voltage battery 40 using electric power from the external power source 90. In the description below, such charging of the high voltage battery 40 by the charging device 50 using electric power from the external power source 90 is called "external charging".

In the course of external charging, the electronic control unit 80 performs a sub-side power supply process that drives the sub DC/DC converter 72 to supply electric power to the low voltage-system power lines 64, while performing a main-side power supply process that turns on the system main relay SMR and drives the main DC/DC converter 70 to supply electric power to the low voltage-system power lines 64. According to the embodiment, by taking into account that the rated output of the sub DC/DC converter 72 is smaller than the rated output of the main DC/DC converter 70, when there is no need to supply a very high electric power to the low voltage-system power lines 64, the electronic control unit 80 performs the sub-side power supply process. When there is a need to supply a relatively high electric power to the low voltage-system power lines 64, on the other hand, the electronic control unit 80 performs the main-side power supply process. There is a need to supply a relatively high electric power to the low voltage-system power lines 64, for example, when there is a need to charge the low voltage battery 60 (more specifically, when a voltage Vb2 or a state of charge SOC2 of the low voltage battery 60 becomes lower than a reference value).

In the course of external charging, when the state of charge SOC of the high voltage battery 40 reaches a target state of charge SOC* or when the state of charge SOC of the high voltage battery 40 does not yet reach the target state of charge SOC* and a charging power Pchg of the high voltage battery 40 is equal to or lower than a reference value Pchref, the external charging is to be terminated. The state of charge SOC of the high voltage battery 40 used here may be a value calculated based on the integrated value of the electric current Ib of the high voltage battery 40 from the current sensor 40b. The target state of charge SOC* used here may be, for example, 80%, 85% or 90%. The charging power Pchg of the high voltage battery 40 used here may be a product (which takes a positive value when the high voltage battery 40 is charged) of a voltage Vb1 of the high voltage battery 40 from the voltage sensor 40a and the electric current Ib1 of the high voltage battery 40 from the current sensor 40b. The reference value Pchref used here may be, for example, 200 W, 250 W or 300 W.

Figure 2:
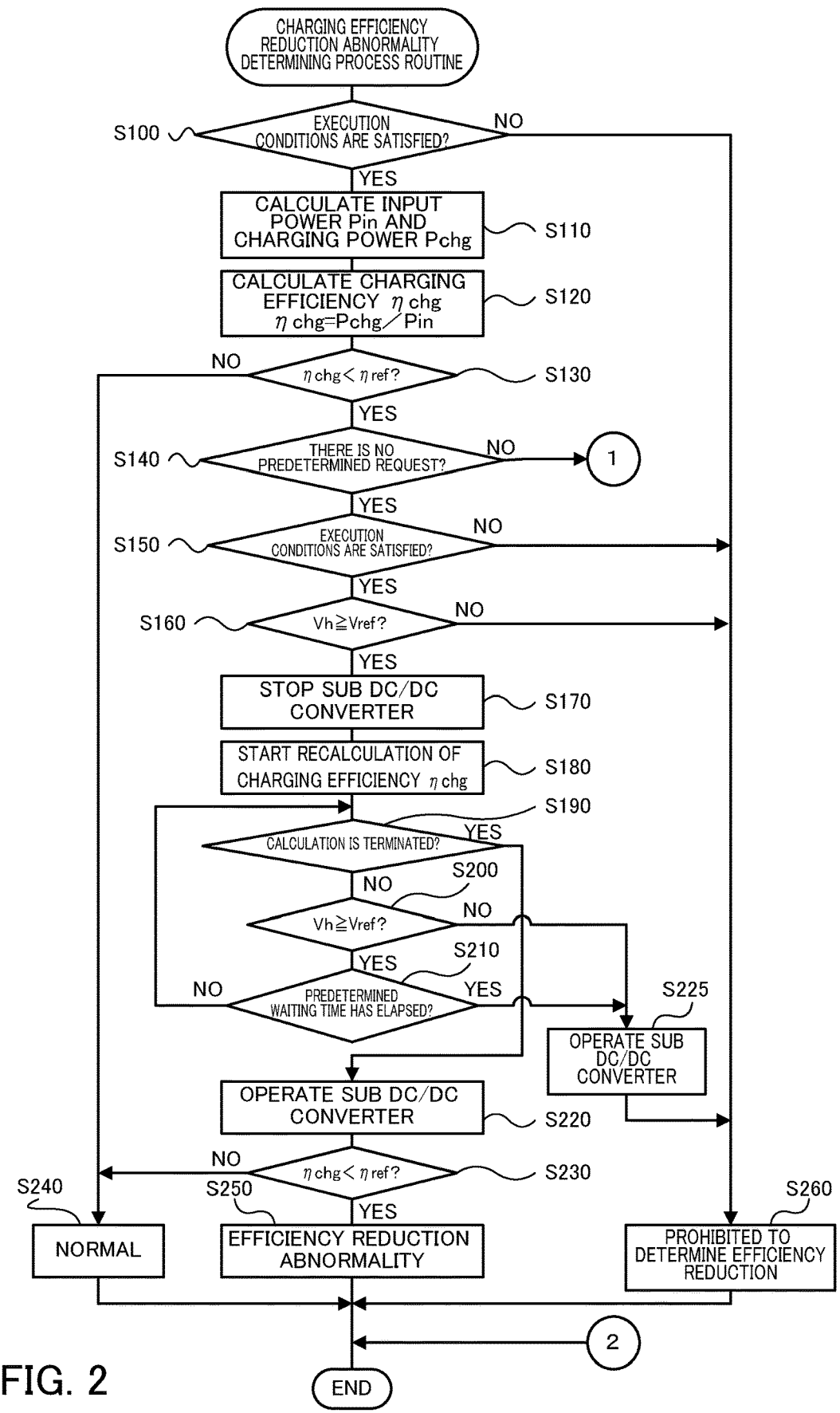
FIG. 2 is a flowchart showing one example of a charging efficiency reduction abnormality determining process routine performed by an electronic control unit according to the embodiment.

The following describes the operations of the electric vehicle 20 of the embodiment having the configuration described above or more specifically a series of operations to determine a reduction abnormality of the charging efficiency in the course of external charging. FIG. 2 is a flowchart showing one example of a charging efficiency reduction abnormality determining process routine performed by the electronic control unit 80 according to the embodiment. In response to a need for determining a reduction abnormality of the charging efficiency in the course of external charging, this charging efficiency reduction abnormality determining process routine is performed, for example, after elapse of every predetermined time period since a start of external charging.

When the charging efficiency reduction abnormality determining process routine is triggered, the electronic control unit 80 first determines whether execution conditions required for execution of the process of determining a reduction abnormality of the charging efficiency are satisfied (step S100). The execution conditions include, for example, a condition that all the sensors including the voltage sensors 40a and 53a and the current sensors 40b and 53b normally operate, a condition that zero point learning (correction learning of an offset error) of the current sensor 40b used to detect the battery current IB is completed, a condition that the voltage of a power source used to supply electric power to the electronic control unit 80 is not lowered, a condition that the voltage of the external power source is not lowered, a condition that there is a start request for the charging device 50 (it is determined that there is a start request during charging), a condition that the charging relay CHR is on, a condition that the system main relay SMR is off, a condition that the input power into the charging device 50 is equal to or higher than a predetermined input power, and a condition that a charging power command is equal to or higher than a predetermined charging power. These conditions are required factors for adequately calculating the charging efficiency. Conditions other than these conditions may be added to the execution conditions. It is determined that the execution conditions are not satisfied, when any of these conditions is unsatisfied. It is determined that the execution conditions are satisfied only when all these conditions are satisfied. When it is determined that the execution conditions are not satisfied, the electronic control unit 80 determines that it is impossible (prohibited) to determine a reduction abnormality of the charging efficiency (step S260) and terminates this routine.

When it is determined at step S100 that the execution conditions are satisfied, on the other hand, the electronic control unit 80 calculates an input power Pin and a charging power Pchg (step S110) and calculates a charging efficiency $\eta chg$ by dividing the charging power Pchg by the input power Pin (step S120). The input power Pin is calculated as a product of the input voltage Vin detected by the voltage sensor 53a that is mounted on the downstream side of the connector 52 of the charging device 50 and the input current Iin detected by the current sensor 53b. The input power Pin is an AC power, so that an effective value is used as the input current Iin. The charging power Pchg is calculated as a product of the battery voltage VB detected by the voltage sensor 40a that is placed between the terminals of the high voltage battery 40 and the battery current IB detected by the current sensor 40b.

The electronic control unit 80 subsequently determines whether the calculated charging efficiency $\eta chg$ is equal to or higher than a reference value $\eta ref$ (step S130). The reference value $\eta ref$ is set in advance as a lower limit value for determining that the external charging is normal in terms of the charging efficiency, and may be, for example, 50% or 55%. When it is determined that the charging efficiency ηchg is equal to or higher than the reference value ηref, the electronic control unit 80 determines that the external charging is normal in terms of the charging efficiency (step S240) and terminates this routine.

When it is determined at step S130 that the charging efficiency ηchg is lower than the reference value ηref, on the other hand, the electronic control unit 80 determines whether there is no predetermined request (step S140). The predetermined request is, for example, a request for performing the main-side power supply process with switching over from the sub DC/DC converter 72 to the main DC/DC converter 70, due to an abnormality of the low voltage battery 60 or the like (low voltage battery-based request), a request for performing the main-side power supply process with switching over from the sub DC/DC converter 72 to the main DC/DC converter 70, due to an abnormality of the sub DC/DC converter 72 or the like (sub DC/DC converter abnormality-based request), a temperature rise request for the high voltage battery 40, or a driving request of the air conditioner 36 by the driver or the like (driver or the like's request). These requests are basically the request for performing the main-side power supply process with switching over from the sub DC/DC converter 72 to the main DC/DC converter 70. When it is determined that there is the predetermined request, the electronic control unit 80 performs processes in response to the respective requests as shown in FIGS. 3 to 6. These processes will be described later.

When it is determined at step S140 that there is no predetermined request, the electronic control unit 80 subsequently determines whether the execution conditions required for execution of the process of determining a reduction abnormality of the charging efficiency are satisfied (step S150). The execution conditions are described above. When it is determined that the execution conditions are not satisfied, the electronic control unit 80 determines that it is impossible (prohibited) to determine a reduction abnormality of the charging efficiency (step S260) and terminates this routine.

When it is determined at step S150 that the execution conditions are satisfied, on the other hand, the electronic control unit 80 determines whether the auxiliary machinery voltage Vh is equal to or higher than a reference value Vref (step S160). The reference value Vref is determined in advance as a lower limit voltage required for driving the auxiliary machines or a voltage that is slightly higher than this lower limit voltage. When it is determined that the auxiliary machinery voltage Vh is lower than the reference value Vref, the electronic control unit 80 determines that it is impossible to stop the sub DC/DC converter 72 and thereby it is impossible (prohibited) to determine a reduction abnormality of the charging efficiency (step S260) and terminates this routine.

When it is determined at step S160 that the auxiliary machinery voltage Vh is equal to or higher than the reference value Vref, the electronic control unit 80 stops the sub DC/DC converter 72 (step S170). The electronic control unit 80 subsequently starts recalculation of the charging efficiency ηchg (step S180) and determines whether a predetermined waiting time has elapsed, whether calculation of the charging efficiency ηchg is terminated before elapse of the predetermined waiting time, and whether the auxiliary machinery voltage Vh becomes lower than the reference value Vref before elapse of the predetermined waiting time (steps S190 to S210). Recalculation of the charging efficiency ηchg follows the process of steps S110 and S120 described above. Since there is a need to obtain the effective value of the input current Iin as described above and the charging power Pchg needs to be a value over some period of time, such recalculation takes a certain time period. The predetermined waiting time is experimentally or otherwise determined in advance as a slightly long time period than a time period required for calculation of the charging efficiency ηchg.

When the calculation of the charging efficiency ηchg is terminated before elapse of the predetermined waiting time since the start of recalculation of the charging efficiency ηchg, the electronic control unit 80 operates the sub DC/DC converter 72 (step S220) and determines whether the calculated charging efficiency ηchg is equal to or higher than the reference value ηref (step S230). When it is determined that the charging efficiency ηchg is equal to or higher than the reference value ηref, the electronic control unit 80 determines that the external charging is normal in terms of the charging efficiency (step S240) and terminates this routine. When it is determined that the charging efficiency ηchg is lower than the reference value ηref, on the other hand, the electronic control unit 80 determines a reduction abnormality of the charging efficiency (step S250) and terminates this routine. This series of process ensures more appropriate determination of a reduction abnormality of the charging efficiency.

When the auxiliary machinery voltage Vh becomes lower than the reference value Vref before elapse of the predetermined waiting time since the start of recalculation of the charging efficiency ηchg, the electronic control unit 80 operates the sub DC/DC converter 72 (step S225), in order to recover the auxiliary machinery voltage Vh. In this case, the electronic control unit 80 determines that it is impossible (prohibited) to determine a reduction abnormality of the charging efficiency (step S260) and terminates this routine. This suppresses the occurrence of a trouble in driving the auxiliary machines.

When the predetermined waiting time has elapsed since the start of recalculation of the charging efficiency ηchg without terminating the calculation of the charging efficiency ηchg, the electronic control unit 80 operates the sub DC/DC converter 72 (step S225). In this case, the electronic control unit 80 determines that it is impossible (prohibited) to determine a reduction abnormality of the charging efficiency (step S260) and terminates this routine. This prevents the sub DC/DC converter 72 from being stopped over a long time period.

Figure 3:
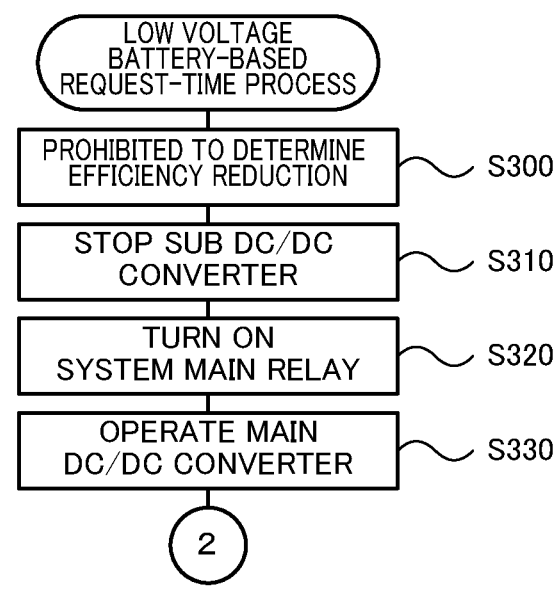
FIG. 3 is a flowchart showing one example of a low voltage battery-based request-time process performed by the electronic control unit according to the embodiment.

FIG. 3 is a flowchart showing one example of a low voltage battery-based request-time process performed by the electronic control unit 80, in response to a request for performing the main-side power supply process with switching over from the sub DC/DC converter 72 to the main DC/DC converter 70, due to an abnormality of the low voltage battery 60 or the like (low voltage battery-based request), as the predetermined request. In the low voltage battery-based request-time process, there is a need to supply required electric power to all the auxiliary machines on the assumption of a failure in supplying electric power from the low voltage battery 60 to the auxiliary machines. Accordingly, the electronic control unit 80 determines that it is impossible (prohibited) to determine a reduction abnormality of the charging efficiency (step S300). The electronic control unit 80 then immediately stops the sub DC/DC converter 72 (step S310), turns on the system main relay SMR (step S320), operates the main DC/DC converter 70

(step S330) and terminates this process. This enables required electric power to be supplied to all the auxiliary machines.

Figure 4:
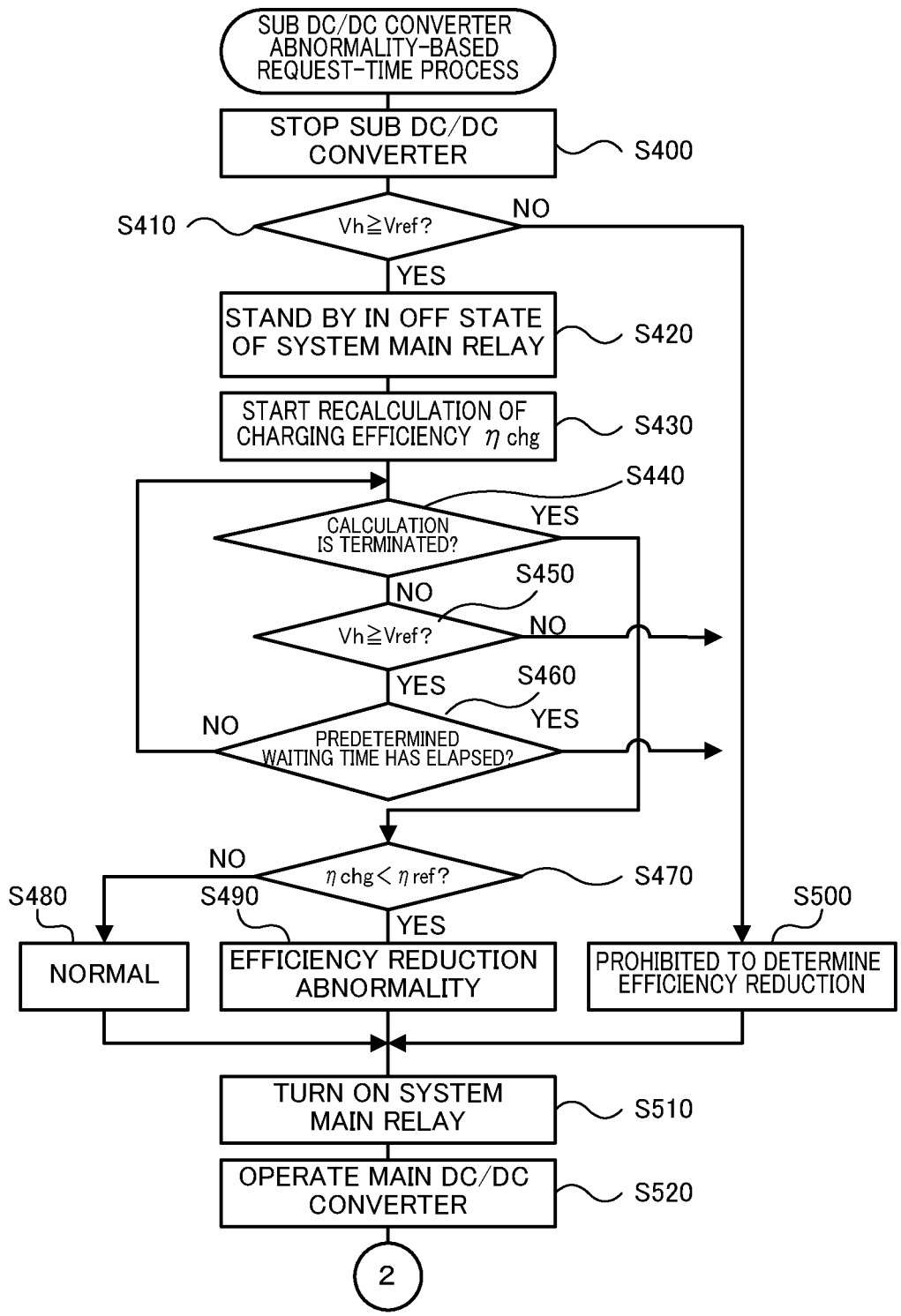
FIG. 4 is a flowchart showing one example of a sub DC/DC converter abnormality-based request-time process performed by the electronic control unit according to the embodiment.

FIG. 4 is a flowchart showing one example of a sub DC/DC converter abnormality-based request-time process performed by the electronic control unit 80, in response to a request for performing the main-side power supply process with switching over from the sub DC/DC converter 72 to the main DC/DC converter 70, due to an abnormality of the sub DC/DC converter 72 or the like (sub DC/DC converter abnormality-based request), as the predetermined request.

In the sub DC/DC converter abnormality-based request-time process, the electronic control unit 80 immediately stops the sub DC/DC converter 72 (step S400). The electronic control unit 80 subsequently determines whether the auxiliary machinery voltage Vh is equal to or higher than the reference value Vref (step S410). When it is determined that the auxiliary machinery voltage Vh is lower than the reference value Vref, it is determined that there is a need to operate the main DC/DC converter 70 immediately. The electronic control unit 80 determines that it is impossible (prohibited) to determine a reduction abnormality of the charging efficiency (step S500), turns on the system main relay SMR (step S510), operates the main DC/DC converter 70 (step S520) and terminates this process. This enables electric power to be supplied immediately to the auxiliary machines and charges the low voltage battery 60.

When it is determined at step S410 that the auxiliary machinery voltage Vh is equal to or higher than the reference value Vref, on the other hand, the electronic control unit 80 stands by in the off state of the system main relay SMR (step S420), starts recalculation of the charging efficiency $\eta$chg (step S430) and determines whether a predetermined waiting time has elapsed, whether calculation of the charging efficiency $\eta$chg is terminated before elapse of the predetermined waiting time, and whether the auxiliary machinery voltage Vh becomes lower than the reference value Vref before elapse of the predetermined waiting time (steps S440 to S460).

When the calculation of the charging efficiency $\eta$chg is terminated before elapse of the predetermined waiting time since the start of recalculation of the charging efficiency $\eta$chg, the electronic control unit 80 determines whether the calculated charging efficiency $\eta$chg is equal to or higher than the reference value $\eta$ref (step S470). When it is determined that the charging efficiency $\eta$chg is equal to or higher than the reference value $\eta$ref, the electronic control unit 80 determines that the external charging is normal in terms of the charging efficiency (step S480). When it is determined that the charging efficiency $\eta$chg is lower than the reference value $\eta$ref, on the other hand, the electronic control unit 80 determines a reduction abnormality of the charging efficiency (step S490). The electronic control unit 80 subsequently turns on the system main relay SMR (step S510), operates the main DC/DC converter 70 (step S520) and terminates this process. This ensures more appropriate determination of a reduction abnormality of the charging efficiency.

When the auxiliary machinery voltage Vh becomes lower than the reference value Vref before elapse of the predetermined waiting time since the start of recalculation of the charging efficiency $\eta$chg, the electronic control unit 80 determines that it is impossible (prohibited) to determine a reduction abnormality of the charging efficiency (step S500), immediately turns on the system main relay SMR (step S510), operates the main DC/DC converter 70 (step S520) and terminates this process. This enables electric power to be supplied immediately to the auxiliary machines and charges the low voltage battery 60.

When the predetermined waiting time has elapsed since the start of recalculation of the charging efficiency $\eta$chg without terminating the calculation of the charging efficiency $\eta$chg, the electronic control unit 80 determines that it is impossible (prohibited) to determine a reduction abnormality of the charging efficiency (step S500), immediately turns on the system main relay SMR (step S510), operates the main DC/DC converter 70 (step S520) and terminates this process. This prevents operation of the main DC/DC converter 70 from being unnecessarily delayed.

Figure 5:
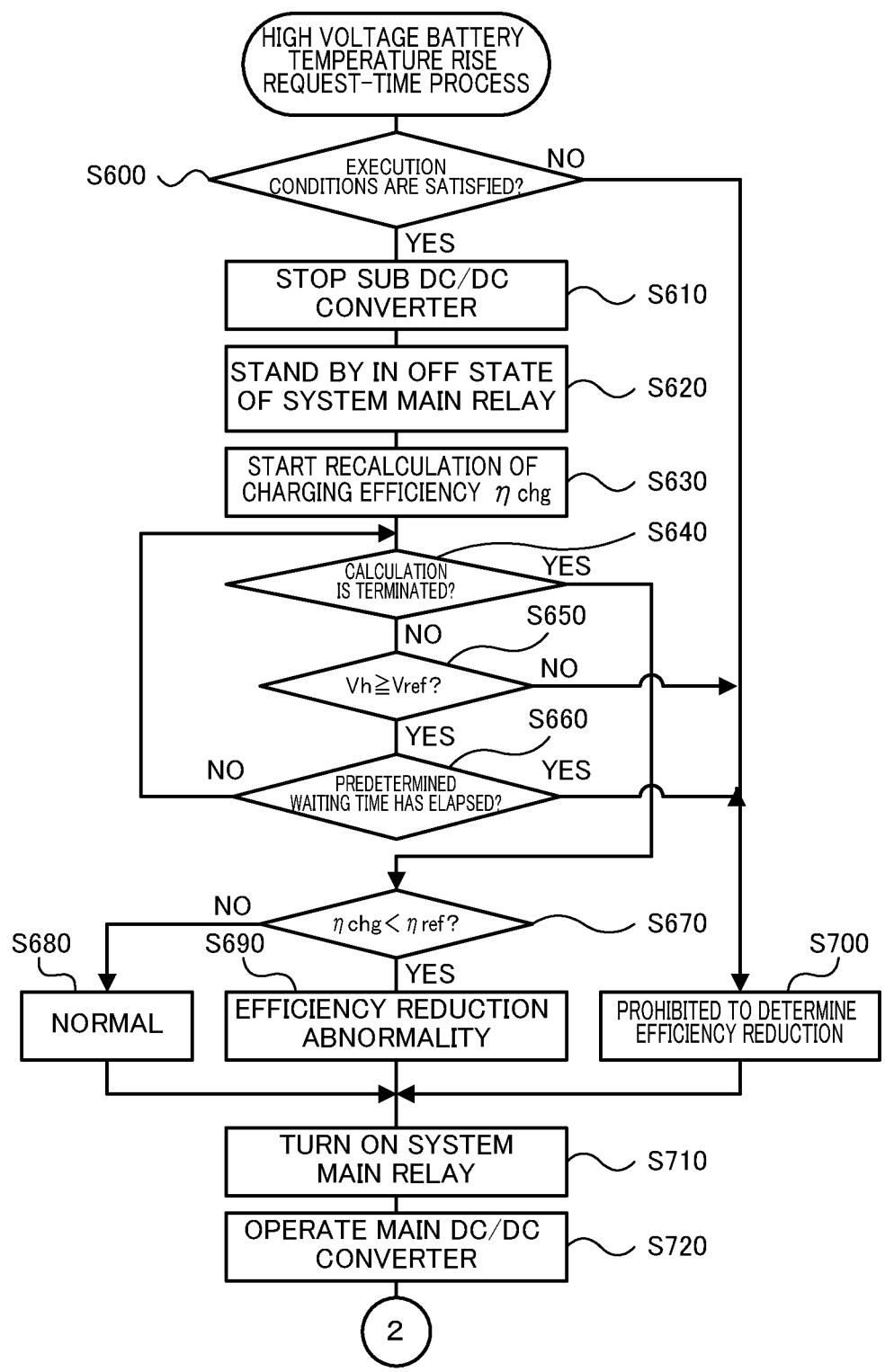
FIG. 5 is a flowchart showing one example of a high voltage battery temperature rise request-time process performed by the electronic control unit according to the embodiment.

FIG. 5 is a flowchart showing one example of a high voltage battery temperature rise request-time process performed by the electronic control unit 80, in response to a temperature rise request for the high voltage battery 40. In the high voltage battery temperature rise request-time process, the electronic control unit 80 first determines whether execution conditions required for execution of the process of determining a reduction abnormality of the charging efficiency are satisfied (step S600). The execution conditions are described above. When it is determined that the execution conditions are not satisfied, the electronic control unit 80 determines that it is impossible (prohibited) to determine a reduction abnormality of the charging efficiency (step S700), immediately turns on the system main relay SMR (step S710), operates the main DC/DC converter 70 (step S720) and terminates this process. This ensures an immediate temperature rise of the high voltage battery 40 by the heater 62 as an auxiliary machine.

When it is determined at step S600 that the execution conditions are satisfied, on the other hand, the electronic control unit 80 stops the sub DC/DC converter 72 (step S610). The electronic control unit 80 then stands by in the off state of the system main relay SMR (step S620), starts recalculation of the charging efficiency $\eta$chg (step S630) and determines whether a predetermined waiting time has elapsed, whether calculation of the charging efficiency $\eta$chg is terminated before elapse of the predetermined waiting time, and whether the auxiliary machinery voltage Vh becomes lower than the reference value Vref before elapse of the predetermined waiting time (steps S640 to S660).

When the calculation of the charging efficiency $\eta$chg is terminated before elapse of the predetermined waiting time since the start of recalculation of the charging efficiency $\eta$chg, the electronic control unit 80 determines whether the calculated charging efficiency $\eta$chg is equal to or higher than the reference value $\eta$ref (step S670). When it is determined that the charging efficiency $\eta$chg is equal to or higher than the reference value $\eta$ref, the electronic control unit 80 determines that the external charging is normal in terms of the charging efficiency (step S680). When it is determined that the charging efficiency $\eta$chg is lower than the reference value $\eta$ref, on the other hand, the electronic control unit 80 determines a reduction abnormality of the charging efficiency (step S690). The electronic control unit 80 subsequently turns on the system main relay SMR (step S710), operates the main DC/DC converter 70 (step S720) and terminates this process. This ensures more appropriate determination of a reduction abnormality of the charging efficiency.

When the auxiliary machinery voltage Vh becomes lower than the reference value Vref before elapse of the predetermined waiting time since the start of recalculation of the charging efficiency $\eta$chg, the electronic control unit 80 determines that it is impossible (prohibited) to determine a reduction abnormality of the charging efficiency (step S700), immediately turns on the system main relay SMR (step S710), operates the main DC/DC converter 70 (step S720) and terminates this process. This enables electric power to be supplied immediately to the auxiliary machines, charges the low voltage battery 60, and enables the temperature of the high voltage battery 40 to be raised by the heater 62 more quickly.

When the predetermined waiting time has elapsed since the start of recalculation of the charging efficiency ηchg without terminating the calculation of the charging efficiency ηchg, the electronic control unit 80 determines that it is impossible (prohibited) to determine a reduction abnormality of the charging efficiency (step S700), immediately turns on the system main relay SMR (step S710), operates the main DC/DC converter 70 (step S720) and terminates this process. This prevents operation of the main DC/DC converter 70 from being unnecessarily delayed and prevents a temperature rise of the high voltage battery 40 from being delayed.

Figure 6:
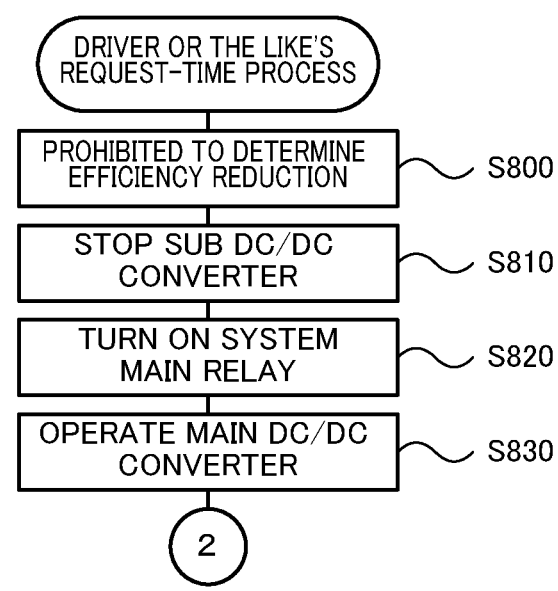
FIG. 6 is a flowchart showing one example of a driver or the like's request-time process performed by the electronic control unit according to the embodiment.

FIG. 6 is a flowchart showing one example of a driver or the like's request-time process performed by the electronic control unit 80, in response to a driving request of the air conditioner 36 by a driver or the like. In the driver or the like's request-time process, the electronic control unit 80 gives priority to the driver or the like's request. Accordingly, the electronic control unit 80 determines that it is impossible (prohibited) to determine a reduction abnormality of the charging efficiency (step S800). The electronic control unit 80 then immediately stops the sub DC/DC converter 72 (step S810), turns on the system main relay SMR (step S820), operates the main DC/DC converter 70 (step S830) and terminates this process. This immediately starts supply of electric power to the air conditioner 36 and meets the driver or the like's request.

As described above, when it is determined that the execution conditions are satisfied and that the calculated charging efficiency ηchg is lower than the reference value ηref, the electric vehicle 20 of the embodiment recalculates the charging efficiency ηchg after stopping the sub DC/DC converter 72 and determines whether the charging efficiency ηchg is equal to or higher than the reference value ηref. This ensures more appropriate determination of a reduction abnormality of the charging efficiency.

Even when it is determined that the execution conditions are satisfied and that the calculated charging efficiency ηchg is lower than the reference value ηref, in the case where the auxiliary machinery voltage Vh is lower than the reference value Vref, the electric vehicle 20 of the embodiment determines that it is impossible (prohibited) to determine a reduction abnormality of the charging efficiency and does not preform recalculation of the charging efficiency ηchg. This suppresses the auxiliary machinery voltage Vh from decreasing to be lower than the reference value Vref and enables the auxiliary machines to be driven normally.

When recalculation of the charging efficiency ηchg is not terminated before elapse of the predetermined waiting time since the start of the recalculation of the charging efficiency ηcng, the electric vehicle 20 of the embodiment operates the sub DC/DC converter 72 and determines that it is impossible (prohibited) to determine a reduction abnormality of the charging efficiency. This prevents the sub DC/DC converter 72 from being stopped over a long time period.

When the auxiliary machinery voltage Vh becomes lower than the reference value Vref before elapse of the predetermined waiting time since the start of recalculation of the charging efficiency ηcng, the electric vehicle 20 of the embodiment operates the sub DC/DC converter 72 and determines that it is impossible (prohibited) to determine a reduction abnormality of the charging efficiency. This suppresses the auxiliary machinery voltage Vh from decreasing to be lower than the reference value Vref and enables the auxiliary machines to be driven normally.

When it is determined that the execution conditions are satisfied and that the calculated charging efficiency ηchg is lower than the reference value ηref, in response to a low voltage battery-based request as the predetermined request, the electric vehicle 20 of the embodiment determines that it is impossible (prohibited) to determine a reduction abnormality of the charging efficiency and immediately switches over from the sub DC/DC converter 72 to the main DC/DC converter 70. This enables required electric power to be supplied to all the auxiliary machines.

When it is determined that the execution conditions are satisfied and that the calculated charging efficiency ηchg is lower than the reference value ηref, in response to a sub DC/DC converter abnormality-based request as the predetermined request, the electric vehicle 20 of the embodiment stops the sub DC/DC converter 72, stands by for an ON operation of the system main relay SMR for the predetermined waiting time, and recalculates the charging efficiency ηchg. This ensures more appropriate determination of a reduction abnormality of the charging efficiency. In this case, when recalculation of the charging efficiency ηchg is not terminated before elapse of the predetermined waiting time since the start of the recalculation of the charging efficiency ηchg, the electric vehicle 20 of the embodiment determines that it is impossible (prohibited) to determine a reduction abnormality of the charging efficiency, turns on the system main relay SMR and operates the main DC/DC converter 70. This prevents switchover to the main DC/DC converter 70 from taking an unnecessarily long time. Additionally, when recalculation of the charging efficiency ηchg is not terminated before elapse of the predetermined waiting time since the start of the recalculation of the charging efficiency ηchg, the electric vehicle 20 of the embodiment determines that it is impossible (prohibited) to determine a reduction abnormality of the charging efficiency, immediately turns on the system main relay SMR and operates the main DC/DC converter 70. This suppresses the auxiliary machinery voltage Vh from decreasing to be lower than the reference value Vref and enables the auxiliary machines to be driven normally.

When it is determined that the execution conditions are satisfied and that the calculated charging efficiency ηchg is lower than the reference value ηref, in response to a high voltage battery temperature rise request as the predetermined request, the electric vehicle 20 of the embodiment stops the sub DC/DC converter 72 based on satisfaction of the execution conditions, stands by for an ON operation of the system main relay SMR for the predetermined waiting time, and recalculates the charging efficiency ηchg. This ensures more appropriate determination of a reduction abnormality of the charging efficiency. In this case, when the execution conditions are not satisfied, the electronic control unit 80 immediately turns on the system main relay SMR and operates the main DC/DC converter 70. This immediately raises the temperature of the high voltage battery 40. When recalculation of the charging efficiency ηchg is not terminated before elapse of the predetermined waiting time since the start of the recalculation of the charging efficiency ηchg, the electric vehicle 20 of the embodiment determines that it is impossible (prohibited) to determine a reduction abnormality of the charging efficiency, turns on the system main relay SMR and operates the main DC/DC converter 70.

This prevents a temperature rise of the high voltage battery 40 from being unnecessarily delayed. Additionally, when recalculation of the charging efficiency ηchg is not terminated before elapse of the predetermined waiting time since the start of the recalculation of the charging efficiency ηchg, the electric vehicle 20 of the embodiment determines that it is impossible (prohibited) to determine a reduction abnormality of the charging efficiency, immediately turns on the system main relay SMR and operates the main DC/DC converter 70. This suppresses the auxiliary machinery voltage Vh from decreasing to be lower than the reference value Vref and raises the temperature of the high voltage battery 40 quickly.

When it is determined that the execution conditions are satisfied and that the calculated charging efficiency ηchg is lower than the reference value ηref, in response to a driver or the like's request as the predetermined request, the electric vehicle 20 of the embodiment determines that it is impossible (prohibited) to determine a reduction abnormality of the charging efficiency and immediately switches over from the sub DC/DC converter 72 to the main DC/DC converter 70. This immediately starts supply of electric power to the air conditioner 36 and meets the driver or the like's request.

When the calculation of the charging efficiency ηchg is terminated before elapse of the predetermined waiting time, the electric vehicle 20 of the embodiment turns on the system main relay SMR and operates the main DC/DC converter 70 after determining a reduction abnormality of the charging efficiency. When the calculation of the charging efficiency ηchg is terminated before elapse of the predetermined waiting time, however, a modification may determine a reduction abnormality of the charging efficiency after turning on the system main relay SMR and operating the main DC/DC converter 70. Another modification may determine a reduction abnormality of the charging efficiency simultaneously with operating the main DC/DC converter 70.

When it is determined that the execution conditions are satisfied and that the calculated charging efficiency ηchg is lower than the reference value ηref, in response to a driver or the like's request as the predetermined request, the electric vehicle 20 of the embodiment determines that it is impossible (prohibited) to determine a reduction abnormality of the charging efficiency. Even in the case of this request, however, a modification may stand by for an ON operation of the system main relay SMR for the predetermined waiting time and recalculate the charging efficiency ηchg.

When it is determined that the execution conditions are satisfied and that the calculated charging efficiency ηchg is lower than the reference value ηref, in response to a high voltage battery temperature rise request as the predetermined request, the electric vehicle 20 of the embodiment stops the sub DC/DC converter 72 based on satisfaction of the execution conditions, stands by for an ON operation of the system main relay SMR for the predetermined waiting time, and recalculates the charging efficiency ηchg. A modification may, however, stop the sub DC/DC converter 72 irrespective of satisfaction of the execution conditions, stand by for an ON operation of the system main relay SMR for the predetermined waiting time, and recalculate the charging efficiency ηchg.

In the case where it is determined that the execution conditions are satisfied and that the calculated charging efficiency ηchg is lower than the reference value ηref, in response to a high voltage battery temperature rise request as the predetermined request, when the calculation of the charging efficiency ηchg is terminated before elapse of the predetermined waiting time, the electric vehicle 20 of the embodiment operates the main DC/DC converter 70 after determining a reduction abnormality of the charging efficiency. A modification may, however, operate the stopped sub DC/DC converter 72, as well as the main DC/DC converter 70.

In the electric vehicle 20 of the embodiment, the high voltage battery 40 is charged by connecting the connector 52 of the charging device 50 with the power source-side connector 92 of the external power source 90 of AC power. According to a modification, however, the high voltage battery 40 may be charged by connecting the connector 52 of the charging device 50 with a power source-side connector of an external power source of DC power. In this modification, the charging device 50 may be equipped with a power converter configured to convert the DC power of the external power source into a desired electric power, and the sub DC/DC converter 72 may be connected between the power converter of the charging device and the charging relay.

The electric vehicle 20 of the embodiment uses the high voltage battery 40 as the power storage device. The power storage device used may, however, be any device configured to accumulate electric power, for example, a capacitor.

The embodiment describes the aspect of the electric vehicle 20 equipped with the motor 32. The present disclosure may also be applicable to an aspect of a hybrid vehicle equipped with an engine in addition to the motor 32.

The electrically driven vehicle of the above aspect may include a system main relay mounted on a power storage device side of a connecting portion of the first power supply device in the driving system power line, in an event of a predetermined trouble that is either an auxiliary machinery-based trouble or a second power supply device-based trouble, the control device may turn on the system main relay and cause the first power supply device to supply electric power to the auxiliary machinery, and the control device may keep off the system main relay and allow the charging efficiency determination process to be performed until elapse of a predetermined waiting time, while turning on the system main relay and prohibiting determination in the charging efficiency determination process after elapse of the predetermined waiting time. In the case of the predetermined trouble, this configuration allows for determination of a reduction abnormality of the charging efficiency in the predetermined waiting time. Even when it is impossible to determine a reduction abnormality of the charging efficiency in the predetermined waiting time, this configuration deals with the auxiliary machine-based trouble or the second power supply device-based trouble after elapse of the predetermined waiting time.

In this aspect, the auxiliary machinery may include an auxiliary machinery battery. In the case of an auxiliary machinery battery-based trouble as the predetermined trouble, the control device may immediately turn on the system main relay without waiting for elapse of the predetermined waiting time and prohibit the determination in the charging efficiency determination process. When a trouble occurs in the auxiliary machinery battery, no electric power is supplied from the auxiliary machinery battery to the other auxiliary machines. There is accordingly a need to immediately turn on the system main relay and start supply of electric power from the first power supply device to the auxiliary machines.

Additionally, when a voltage of an auxiliary machinery system power line, which the auxiliary machinery is connected with, becomes lower than a predetermined voltage before elapse of the predetermined waiting time, the control device may immediately turn on the system main relay and prohibit the determination in the charging efficiency determination process without waiting for elapse of the predetermined waiting time. This configuration suppresses a voltage shortage that the voltage of the auxiliary machinery system power line is lower than the predetermined voltage.

The electrically driven vehicle above aspect may include a system main relay mounted to the driving system power line, which the power storage device and the motor are connected with, in response to a temperature rise request for the power storage device, the control device may keep off the system main relay and allow the charging efficiency determination process to be performed until elapse of the predetermined waiting time, while turning on the system main relay and prohibiting determination in the charging efficiency determination process after elapse of the predetermined waiting time. In the case of a temperature rise request for the power storage device, this configuration allows for determination of a reduction abnormality of the charging efficiency in the predetermined waiting time. Even when it is impossible to determine a reduction abnormality of the charging efficiency in the predetermined waiting time, this configuration turns on the system main relay and raises the temperature of the power storage device after elapse of the predetermined waiting time.

In this aspect, when an execution condition of the charging efficiency determination process is not satisfied, in response to the temperature rise request for the power storage device, the control device may immediately turn on the system relay, prohibits execution of the charging efficiency determination process, and perform a temperature rise control of raising temperature of the power storage device, without waiting for elapse of the predetermined waiting time. This is because there is no need to perform the charging efficiency determination process when the execution condition of the charging efficiency determination process is not satisfied. This configuration raises the temperature of the power storage device without unnecessarily waiting for elapse of the predetermined waiting time.

The electrically driven vehicle above aspect may include a system main relay mounted to the driving system power line, which the power storage device and the motor are connected with, and a driving system auxiliary machine connected on a motor side of the system main relay in the driving system power line and configured to be driven by using electric power of the driving system power line, in response to a request for driving the driving system auxiliary machine by a driver or the like, the control device may immediately turn on the system main relay, prohibit execution of the charging efficiency determination process and drive the driving system auxiliary machine. This gives priority to the driver or the like's request. This configuration suppresses the driver or the like from feeling strange due to a delay of the operation of the driving system auxiliary machine in response to the driver or the like's request.

The following describes the correspondence relationship between the primary elements of the above embodiment and the primary elements of the disclosure described in Summary. The motor 32 of the embodiment corresponds to the "motor", the high voltage battery 40 corresponds to the "power storage device", the main DC/DC converter 70 corresponds to the "first power supply device", the charging device 50 corresponds to the "charging device", the sub DC/DC converter 72 corresponds to the "second power supply device", and the electronic control unit 80 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of electrically driven vehicles.

The invention claimed is:

1. An electrically driven vehicle, comprising:
a motor configured to input and output power for driving;
a power storage device configured to transmit electric power to and from the motor;
a main DC/DC converter connected with a driving system power line, which the power storage device and the motor are connected with, and configured to convert electric power from the driving system power line and supply the converted electric power to auxiliary machinery mounted on a vehicle;
a charging device configured to charge the power storage device by using electric power from an external power source;
a sub DC/DC converter configured to supply part of the electric power from the external power source to the auxiliary machinery via the charging device; and
an electronic control unit configured to perform a charging efficiency determination process that calculates a charging efficiency, which is a ratio of a charging power for charging the power storage device to an input power input into the charging device, and that determines whether the charging efficiency is lower than a predetermined efficiency, wherein
when the charging efficiency determination process determines that the charging efficiency is lower than the predetermined efficiency, the electronic control unit performs the charging efficiency determination process after stopping the sub DC/DC converter.

2. The electrically driven vehicle according to claim 1, further comprising:
a system main relay mounted on a power storage device side of a connecting portion of the main DC/DC converter in the driving system power line, wherein
in an event of a predetermined trouble that is either an auxiliary machinery-based trouble or a sub DC/DC converter-based trouble, the electronic control unit turns on the system main relay and causes the main DC/DC converter to supply electric power to the auxiliary machinery, and the electronic control unit keeps off the system main relay and allows the charging efficiency determination process to be performed until elapse of a predetermined waiting time, while turning on the system main relay and prohibiting determination in the charging efficiency determination process after elapse of the predetermined waiting time.

3. The electrically driven vehicle according to claim 2, wherein the auxiliary machinery includes an auxiliary machinery battery, and in an event of an auxiliary machinery battery-based trouble as the predetermined trouble, the electronic control unit immediately turns on the system main relay and prohibits the determination in the charging efficiency determination process without waiting for elapse of the predetermined waiting time.

4. The electrically driven vehicle according to claim 2, wherein in the case of the predetermined trouble, when a voltage of an auxiliary machinery system power line, which the auxiliary machinery is connected with, becomes lower than a predetermined voltage before elapse of the predetermined waiting time, the electronic control unit immediately turns on the system main relay and prohibits the determination in the charging efficiency determination process without waiting for elapse of the predetermined waiting time.

5. The electrically driven vehicle according to claim 1, further comprising:

a system main relay mounted to the driving system power line, which the power storage device and the motor are connected with, wherein in response to a temperature rise request for the power storage device, the electronic control unit keeps off the system main relay and allows the charging efficiency determination process to be performed until elapse of the predetermined waiting time, while turning on the system main relay and prohibiting determination in the charging efficiency determination process after elapse of the predetermined waiting time.

6. The electrically driven vehicle according to claim 5, wherein when an execution condition of the charging efficiency determination process is not satisfied, in response to the temperature rise request for the power storage device, the electronic control unit immediately turns on the system relay, prohibits execution of the charging efficiency determination process, and performs a temperature rise control of raising temperature of the power storage device, without waiting for elapse of the predetermined waiting time.

7. The electrically driven vehicle according to claim 1, further comprising:

a system main relay mounted to the driving system power line, which the power storage device and the motor are connected with; and a driving system auxiliary machine connected on a motor side of the system main relay in the driving system power line and configured to be driven by using electric power of the driving system power line, wherein in response to a request for driving the driving system auxiliary machine by a driver or the like, the electronic control unit immediately turns on the system main relay, prohibits execution of the charging efficiency determination process and drives the driving system auxiliary machine.

* * * * *